United States Patent [19]
Barry

[11] Patent Number: 6,050,017
[45] Date of Patent: Apr. 18, 2000

[54] FLEXIBLE, SELF-SUPPORTING DECOY

[76] Inventor: Charles Estes Barry, 11,601 Katy Freeway, No. 216, Houston, Tex. 77079

[21] Appl. No.: 09/012,700

[22] Filed: Jan. 23, 1998

[51] Int. Cl.[7] .................................................. A01M 31/06
[52] U.S. Cl. ....................................................... 43/2
[58] Field of Search .................................... 43/2, 3

[56] References Cited

U.S. PATENT DOCUMENTS

| | | | |
|---|---|---|---|
| 957,750 | 5/1910 | Cunningham | 43/2 |
| 1,813,370 | 7/1931 | Villatore et al. | 43/2 |
| 2,256,778 | 9/1941 | Lundgren | 43/2 |
| 2,787,074 | 4/1957 | Miller | 43/2 |
| 2,885,813 | 5/1959 | Kratzert | 43/2 |
| 3,800,457 | 4/1974 | Barrett | 43/2 |
| 4,611,421 | 9/1986 | Jacob | 43/2 |
| 5,003,718 | 4/1991 | Lenert et al. | 43/2 |
| 5,392,554 | 2/1995 | Farstad et al. | 43/3 |
| 5,515,637 | 5/1996 | Johnson | 43/2 |

*Primary Examiner*—Thomas Price
*Attorney, Agent, or Firm*—D. Arlon Groves

[57] ABSTRACT

A flexible, self-supporting decoy for wild game which requires no wind to inflate and which maintains its shape even under heavy dew or rain showers. When used for birds, the decoy may comprise as few as three pieces, namely, a stake, a windsock-type body of flexible yet self-supporting material, and a fastener. The body may be rotatably supported about a stake by the simple expedient of an opening in the lower portion of the body large enough to pass over the stake and a second opening in the upper portion too small to pass over the stake but large enough to receive a fastener with a head or flange large enough to secure the body. Such decoys may be quickly collapsed for transporting or quickly unfurled for decoying, will move with wind, and are lightweight, durable and effective. Formed or molded heads may be added for additional realism.

18 Claims, 2 Drawing Sheets

FLEXIBLE, SELF-SUPPORTING DECOY

BACKGROUND OF THE INVENTION

This invention relates generally to the field of decoys, primarily for use in hunting. The decoys of the present invention are particularly suitable for waterfowl decoys, such as geese, ducks, mergansers and the like, but may be particularly constructed for virtually any type of game, e.g., sandhill cranes, "confidence" decoys, or even larger game such as deer and the like.

The need for and use of decoys to attract wild game, particularly waterfowl, is so old as to antedate even the invention of the shotgun itself. Native Americans, long prior to the arrival of the first Europeans, employed various means to imitate their intended prey, such as woven reeds generally shaped and colored similarly to the prey of interest. Early pioneers, with their better tools for carving, typically carved their decoys out of wood or, later, of cork. At various times various peoples have utilized actual feathers attached in various ways to differing body materials to further add realism to their artifacts. Although many of these earliest decoys were quite effective, in general they were highly labor intensive, so much so as to be prohibitively expensive in today's post-war economy.

Since the advent of mass manufacturing there has been a long felt need for a lightweight, durable, effective decoy inexpensive to manufacture. The requirement for decoys of light weight is particularly critical for waterfowl decoys, where hundreds of decoys prove more effective than tens of decoys, and thousands prove more effective still. Since it is not at all uncommon to have to pack hundreds of decoys for hundreds of yards across deep, rutted mud and/or marsh, the requirement for lightness of weight may be readily appreciated. Further, since such decoys are not typically handled with great care, and since the purchasers of such decoys demand that they last for more than one season, the need for durability is also apparent. And, of course, if the decoy is not realistic enough in appearance to be effective, regardless of how light and/or durable it may be, then it is of no use to the end users.

This long-standing need for lightweight, durable, effective but affordable decoys has given rise to a variety of approaches to fill this need. U.S. Pat. No. 4,062,141 to Shjeflo discloses a flexible bag—in essence, a stylized windsock shaped to resemble the resting body of a waterfowl. By the use of the term resting body is meant that the windsock or bag is flared outwardly from the opening so that the center portion resembles a waterfowl body with folded wings, and is tapered inwardly towards the rear to project the appearance of the tail of a waterfowl. A stake is shown projecting from the bottom of the opening so that the decoy may be affixed to ground, with the upper end of the stake supporting a molded head to further add to the element of realism. However, the inventor of the '141 patent did not contemplate a flexible yet self-supporting body for such a decoy, and so required a hoop member to be attached to the sides of the bag adjacent the opening in order to keep the bag open. With the decoy positioned such that the opening of the bag is oriented into the wind, the wind inflates the bag, thereby giving the body of the decoy a somewhat realistic appearance.

To an experienced hunter, the disadvantages of the '141 approach are both numerous and obvious. First—as is disclosed in the patent itself—the decoy of the '141 patent relies on the wind to create a life-like appearance. Simply stated, if no wind, no realism. In the absence of a sufficient wind to inflate the bag, the body of the decoy will droop down in a most unrealistic position, like a becalmed flag drooping around a flagpole, and will spook rather than attract the intended prey. Further, as virtually every hunter has experienced, even when the wind is blowing at a sufficient velocity to inflate the bag, it does not always blow out of the same direction for an entire day. When the wind changes direction, a windsock decoy with a fixed orientation becomes worse than useless: not only does the wind not inflate the bag, but it may well cause the flexible portion of the bag to flap vigorously in the wind, creating an even more unreal appearance and scaring off the intended prey at even greater distances. The patent teaches that the user may grasp and pivot the bag so that the opening in the bag faces the wind without having to remove the spike from the ground, but for even a small spread of only a few hundred decoys, such a feature is of little or no practical benefit. Further, the material needed for the hoop adds further weight to a bag of hundreds of decoys and adds further expense, as does the requirement that the hoop be attached to the opening of the bag. Should rain occur, the bag will droop listlessly.

A somewhat more sophisticated approach is that disclosed in U.S. Pat. No. 5,172,506 to Tiley and Tiley. The Tiley decoy essentially adds a two-part stake, with one portion of the stake being fixed to the ground and the other portion being free to rotate around the fixed stake. However, like Shjeflo, the Tileys did not contemplate a flexible, self-supporting body, and the invention of the Tileys retained the rigid member to support the opening of the bag. While the device of the '506 patent will automatically adjust to variable wind direction, it otherwise suffers from the same defects as the device of the '141 patent. In addition, with the two stakes and associated means for supporting rotation, the weight of the Tiley decoy is considerably increased, perhaps even double that of the Shjeflo decoy.

Still a different approach is that of U.S. Pat. No. 4,972,620 to Boler. The Boler decoy essentially consists of a flat, monolithic, head-neck-body piece formed out of a stiff sheet of unspecified material. Various relief holes permit the body to be bent around into a shape somewhat resembling a real bird, with tension holding fasteners to secure the sections in place. Although the device cannot self-adjust for changes in wind direction, the claim is made that wind blowing into the "chest" of the decoy will cause a side-to-side wobble of the decoy, along with a limited up and down bobble of the head from wind blowing over the flat head; this wobble and bobble are said to impart life-like realism to the decoy. In view of the requisite stiffness of the head-neck-body sheet, however, this patent is of little relevance to the present invention.

U.S. Pat. No. 4,611,421 to Jacob is similar to Shjeflo in that a stiff head and neck piece is attached to a stake which supports a hoop supporting the opening of a flexible windsock or bag. Jacob appears to add little of interest to Shjeflo other than an interior support for the bag which prevents the bag or "body" from taking on an unnatural position with insufficient wind. Like Shjeflo and the other inventors, Jacob failed to contemplate a flexible yet self-supporting body.

U.S. Pat. No. 4,753,028 to Farmer discloses a specialized, formed plastic head-neck-stake piece to which may be attached a completely flexible, wind-inflatable body or a non-inflatable flexible sheet which can be flared away from the stake by the wind. Only the "body" embodiment would seem pertinent to the present invention, and this embodiment clearly requires a sufficient wind, oriented sufficiently parallel to the decoy, for inflation and support of the body. Clearly, Farmer neither discloses nor contemplates a flexible, self-supporting decoy body.

Other patents of interest include U.S. Pat. No. 4,651,457 to Nelson, Nelson and Williams and U.S. Pat. No. 5,144,764 to Peterson. Nelson also discloses a wind-filled, flexible body bag attached to a semi-rigid head and neck unit, but which in turn is supported by a stake in the manner of a wind vane. Like Farmer, Jacob and the other prior art known to applicant, Nelson neither discloses nor contemplates the use of a flexible, self-supporting decoy body. The Peterson patent discloses a decoy with flexible wings said to move by wind from a lower, "lift" position to an upper, "stall" position, thereby repeatedly flapping its wings somewhat like a live bird. However, Peterson discloses that both body and wings may be constructed of a completely flexible material such as Tyvek™, and Peterson relies on pairs of struts and steel cables to form the desired shape of the wings. Like the others, Peterson clearly fails to disclose or contemplate a flexible yet self-supporting decoy body.

Despite the apparent disadvantages of these crude devices—hundreds or which must be carried by end users for considerable distances under quite difficult situations—none of these inventors conceived the use of a flexible yet self-supporting decoy body to provide a lightweight, durable, effective and inexpensive decoy. It is thus apparent that this long felt need for such a decoy has remained unfulfilled up until the invention of the present invention, which not only overcomes the disadvantages of the prior art but does so more effectively and at lower cost.

SUMMARY OF THE INVENTION

It is therefore a primary object of the present invention to provide a wild game decoy, major portions of which may be constructed out of lightweight, durable, inexpensive flexible material capable of substantially supporting itself and capable of accepting an imprint to closely resemble the wild game of interest. It is a further object of the invention to provide a decoy, major portions of which may be caused to conform closely to the shapes of the bodies or body parts of the game sought to be attracted.

For use with game requiring large numbers of decoys, such as geese, it is yet another object of the present invention to provide flexible, self-supporting bodies light enough in weight to be packed by an individual in quantities as large as several hundred over considerable distances in adverse conditions. Still another object is the provision of bodies or body parts whose shape will not be substantially effected by rain nor the absence of wind, nor by changing wind directions. Yet another object is the provision of decoys whose structure and effectiveness can remain substantially unaltered for multiple seasons of exposure to sun, rain, wind, freezing temperatures, and repeated folding and unfolding.

These and other objects and features and advantages of the present invention will become apparent from the following detailed description, wherein reference is made to the figures in the accompanying drawings.

BRIEF DESCRIPTION OF THE DRAWINGS

The means by which the foregoing objects and features of novelty may be achieved are pointed out with particularity in the claims forming the concluding portion of this specification. The invention, both as to its use and manner of construction, may be further understood by reference to the following description with the following drawings. Although the following drawings and description shall exemplify only a decoy for geese, it is to be understood that the principles of this invention are equally applicable for virtually all other types of game decoys, not just waterfowl or birds in general.

Of the drawings.

DETAILED DESCRIPTION OF THE PREFERRED EMBODIMENT

It is to be understood that the following description is not to be limiting of the scope of this invention but is a description of the preferred embodiment only, i.e., for use as a goose decoy.

Figure 1:
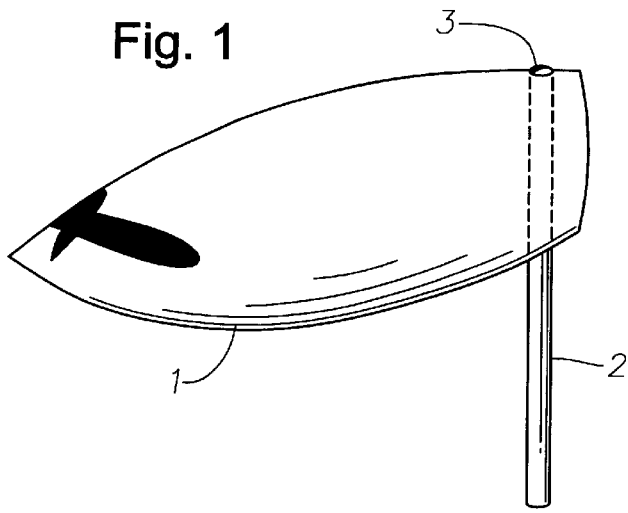
FIG. 1 is a side view of one embodiment of the present invention.
Figure 2:
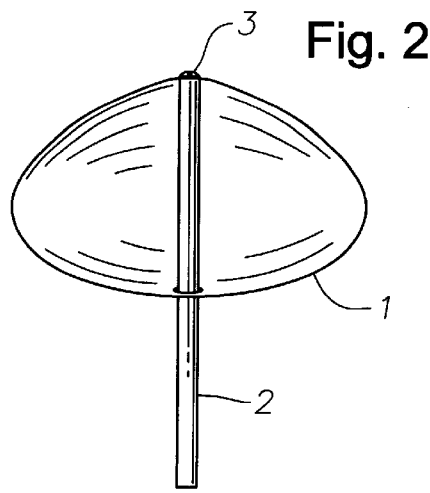
FIG. 2 is a front view of one embodiment of the present invention.
Figure 3:
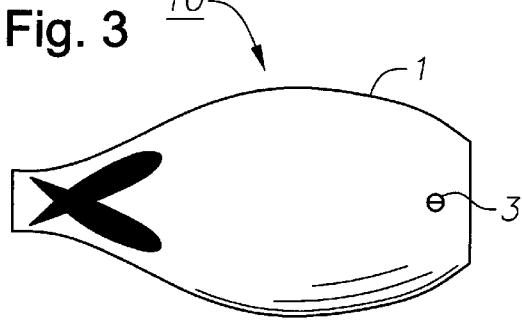
FIG. 3 is a top view of one embodiment of the present invention.
Figure 4:
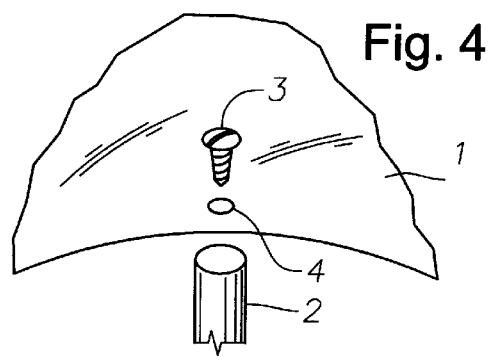
FIG. 4 is an expanded view of portions of the embodiment depicted in the view of FIG. 2.

Modern day hunting of the wild migratory goose typically requires at least hundreds if not thousands of decoys. Considerable expense (and weight) can be saved if the bulk of the decoys are substantially as depicted in FIGS. 1–3, with the embodiment depicted in FIGS. 5–7 utilized more sparingly, typically around the periphery of the spread. The embodiment as depicted in FIGS. 1–3 contains but three parts: a body 1, a stake 2, and a screw or other attaching means 3. The stake 2 is preferably a simple wooden dowel, so that in the event the stake should get broken during use, the user can conveniently replace the broken part himself.

Figure 8:
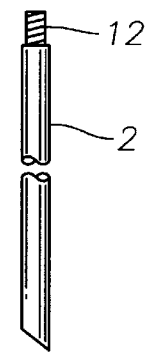
FIG. 8 is a top view of the body of a decoy, at an intermediate step in the assembly or fabrication process.
Figure 8:
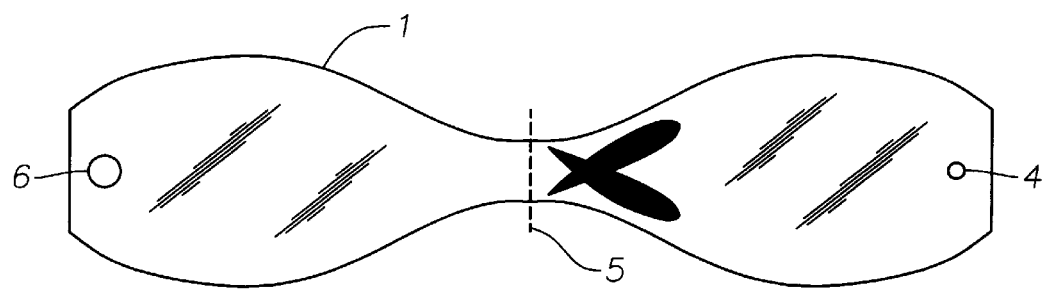

The first step in the preferred manufacturing process is to cut or stamp out what will eventually become the assembled body 1 from a sheet of flexible, self-supporting material. A 4 millimeter, 2-ply, cross laminated, clay coated, high density polyethylene sheet material, marketed under the trade name Valcron™ by Van Leer Flexables, Inc., of Houston, Texas, has been found particularly suitable for the present invention, although any number of other materials would undoubtedly serve equally well also. In any event, it is convenient to cut out, in one piece, what will eventually be the top, bottom and sides of the decoy body, as shown in FIG. 8. The piece may then be folded at the midpoint—represented by the dashed line 5—and the sides (curved edges in this embodiment) joined by any convenient means such as sewing, heat sealing, etc. If the sides are to be sewn, it may be preferred to first fold the piece in the opposite direction to that of its intended final orientation, and, after sewing, turn piece 1 inside out so that the sewn edges and seam will be interior to the completed body 10.

It may be noted from FIG. 8 that the hole 6 is depicted as larger than the hole 4. Hole 6 need be large enough to accommodate the stake, or dowel 2; hole 4 is preferably too small to permit passage of stake 2 therethrough. If these parts are sized in this manner, no other support pieces will be needed.

After assembly of the flat piece 1 of FIG. 8 into the body part or bag 10 of FIGS. 1–3, the stake or dowel 2 may be inserted through orifice 6 up to but not through orifice 4. At this juncture a simple screw 3, or other preferred fastener means, may secure the body 1 to stake 2. Production of the device is thus complete.

To use, stake 2 is inserted into the ground, preferably to a distance that will leave body 10 free of any immediate obstructions. The body 10 is held in place vertically by the top of stake 2, and is held in place horizontally by the interaction of the edge of orifice 6 and stake 2, in one direction, and by the interaction of screw 3 and the edge of orifice 4 in the opposite direction. This is to say, even though body 10 is quite lightweight, it still possesses some weight, which causes it to seek to rotate (in the vertical plane of FIG. 1); the rotation (counterclockwise in the illustration of FIG. 1) is prevented by stake 2, at the bottom of body 10, and by screw 3, at the top of body 10.

If each of the orifices 4 and 6 is slightly larger than its respective fitting part 3 and 2, the decoy body 10 will be free to rotate about stake 2 in an unlimited manner.

Figure 5:
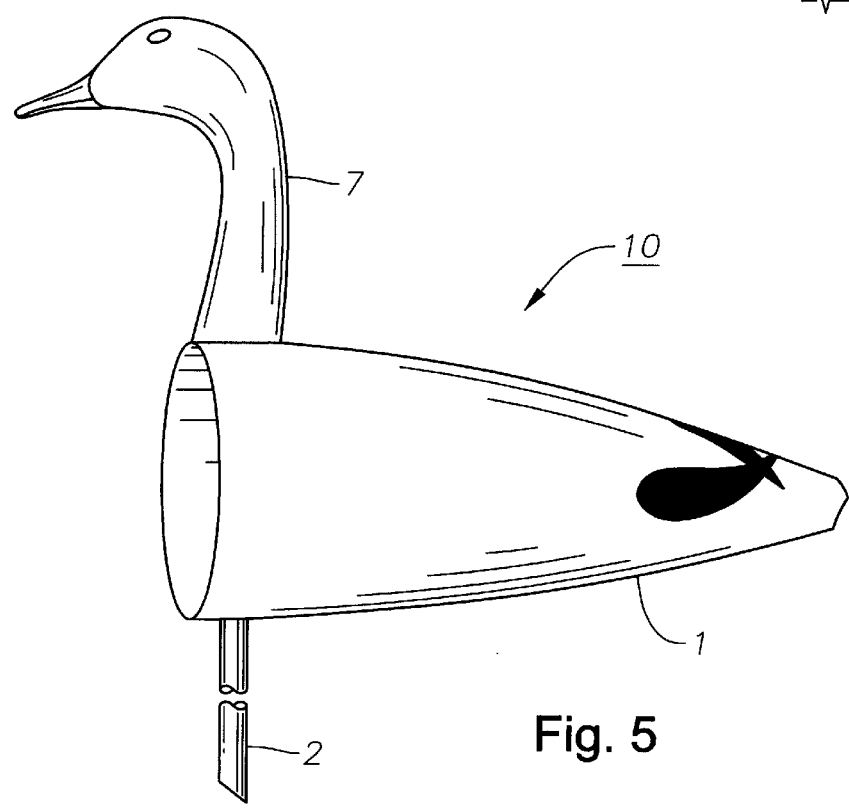
FIG. 5 is a side view of another embodiment of the present invention.
Figure 6:
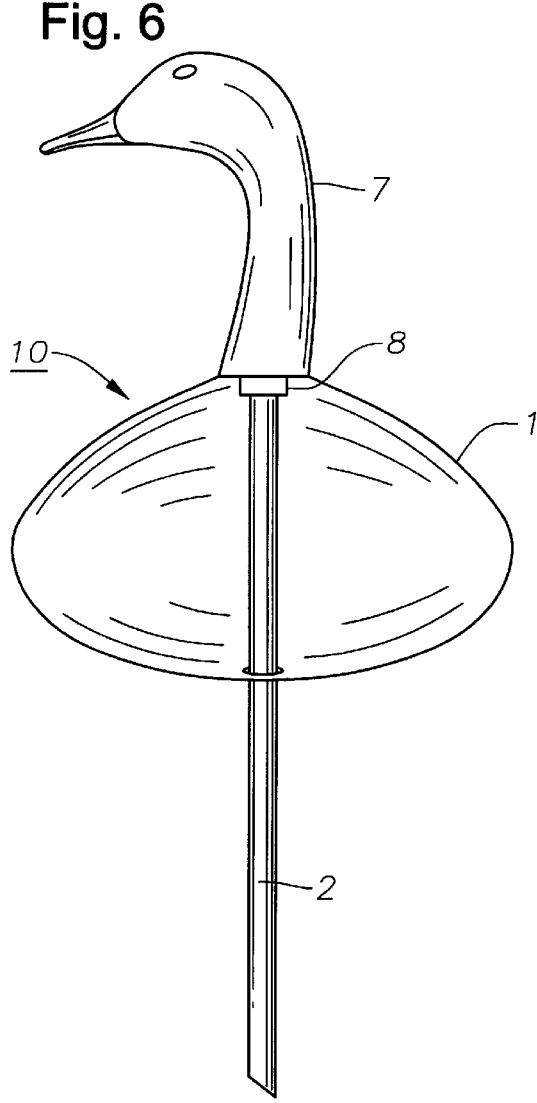
FIG. 6 is a front view of another embodiment of the present invention.
Figure 7:
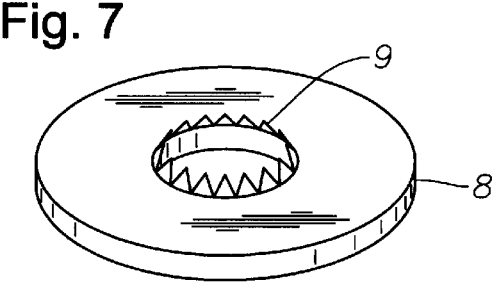
FIG. 7 is an isometric view of one preferred means for supporting body 1 about stake 2.

The embodiment as depicted in FIGS. 5, 6 is similar to the embodiment of FIGS. 1–3 with the addition of a molded head 7 for added realism. Head 7 may be attached in almost any desired manner. If the base of head 7 has an adequately thick base to support the head without undue wobbling, a hole may be drilled in the base sized to provide an interference fit with dowel 2, and the head simply pushed on to the top portion of dowel 2. This method presupposes a means of supporting the top of body 10 other than as described above. A convenient alternative method for providing such support may be provided by sizing upper hole 4 sufficiently large so as to permit the dowel to be pushed on up beyond the top of body 10. All that is then necessary is to adequately support body 10 around dowel 2, which may be accomplished by any desired means. A preferred means for the present invention is by a washer-like device providing either an interference fit or other frictional engagement, such as a toothed ring which will resist motion in the downward direction. Element 8 of FIG. 6 depicts such a ring in a larger view. Those skilled in the art will appreciate that teeth 9 will engage dowel 2 and prevent slippage.

Figure 9:
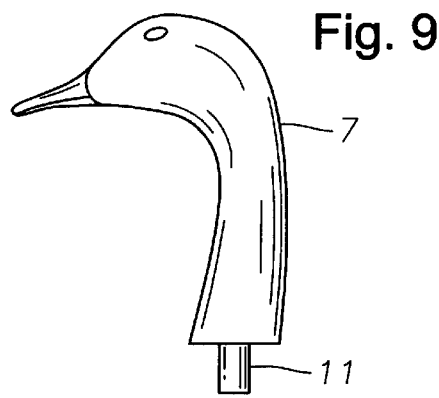
FIG. 9 is an expanded side view of an alternative means for securing a decoy head to a stake.

Some decoy heads will not have an adequately sized base to permit the mechanism described above to satisfactorily secure the heads to the stakes. For this type of decoy head, a wood screw or other type of screw may be inserted into the stake and a plastic protrusion glued to the bottom of the decoy head for receiving the screw means inserted in the stake, as shown in the expanded drawing of FIG. 9. In FIG. 9, element 11 depicts such a protrusion, while element 12 depicts such screw means.

Alternative means for securing the components include slot means in the bottom of the decoy head with complementary protrusions on the stake so that the two may be joined more quickly in the field or separated more quickly for transporting. The exact means of securing the components is not critical; any convenient means may be employed. Further, if desired, slots may be cut out of the rear portion of the decoy body to permit its use in higher winds.

As used herein, the phrase "decoy head" is not to be strictly construed as the head only of a decoy; most such decoy "heads" commercially available now include a neck portion integral therewith. However, it has become established in the industry to use the convenient term "head" for all such decoy pieces, whether they consist of a head only or of an integral head and neck, and that practice is continued here.

It should be noted that the versions with heads will still be free to rotate with the wind, although the stake and head will normally remain fixed. This is not only not a disadvantage, but actually an advantage, in that any large flock of real birds does not have all the members' heads pointed straight ahead, but will have numerous members whose heads are at various orientations to their bodies, even rotated 180° with respect thereto.

It should also be noted that a number of different embodiments and variations of the present invention has been described and claimed herein. Still other alternate forms of the present invention will suggest themselves from a consideration of the apparatus and practices hereinbefore disclosed. Accordingly, it should be clearly understood that the devices and techniques described in the foregoing explanations and depicted in the foregoing drawings are intended as exemplary embodiments of the invention and not as limitations thereto.

I claim:

1. A wild game windsock decoy comprising self-supporting yet flexible decoy means.

2. The decoy of claim 1, further comprising means for supporting said said decoy means about a stake, whereby said decoy means may alternately be rapidly collapsed about said stake for transporting or rapidly disposed about said stake for decoying.

3. The decoy of claim 1, further comprising means for rotatably supporting said decoy means about a stake, whereby the orientation of said decoy means about said stake may be automatically changed with changes in wind direction.

4. The decoy of claim 1, wherein at least an upper portion of said decoy means is comprised of a flexible, self-supporting material.

5. The decoy of claim 1, wherein a substantial portion of said decoy means is imprinted to resemble wild game of interest.

6. The decoy of claim 1, wherein a substantial portion of said decoy means is comprised of high density cross laminated polyethylene.

7. The decoy of claim 2, said supporting means further comprising an orifice in an upper portion of said decoy means sized so as to prevent said stake from passing therethrough and adapted to receive fastening means therethrough.

8. The decoy of claim 7, said fastening means comprising a retaining portion sized larger than said orifice.

9. The decoy of claim 2, said supporting means further comprising an orifice in a lower portion of said decoy means sized to permit said stake to pass therethrough.

10. The decoy of claim 1, further comprising a decoy head attachable to said decoy means.

11. The decoy of claim 2, further comprising a decoy head attachable to said stake.

12. The decoy of claim 11, wherein said decoy head is attachable by means of an interference fit between said head and said stake.

13. The decoy of claim 11, wherein said decoy head is attachable by screw means between said head and said stake.

14. The decoy of claim 13, wherein said screw means is attached to an upper portion of said stake and the lower portion of said decoy head is adapted to receive said screw means.

15. The decoy of claim 14, wherein said screw receiving adaptation to said head comprises a protrusion external to said decoy head.

16. The decoy of claim 11, wherein said decoy head is attachable by co-acting slot means between said head and said stake.

17. The decoy of claim 2, said supporting means further comprising an orifice in an upper portion of said decoy means sized so as to permit said stake to pass therethrough and means for retaining said upper portion of said decoy means near the upper portion of said stake.

18. The decoy of claim 2, said stake further comprising shoulder means for supporting said decoy means below the top of said stake.

* * * * *